(12) United States Patent
Fan

(10) Patent No.: US 9,897,840 B2
(45) Date of Patent: Feb. 20, 2018

(54) SEAMLESS SPLICING MULTI-PANEL DISPLAY DEVICES

(71) Applicant: Shenzhen China Star Optoelectronics Technology Co., Ltd., Shenzhen, Guangdong (CN)

(72) Inventor: Yong Fan, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 224 days.

(21) Appl. No.: 14/891,726

(22) PCT Filed: Oct. 22, 2015

(86) PCT No.: PCT/CN2015/092547
§ 371 (c)(1),
(2) Date: Nov. 17, 2015

(87) PCT Pub. No.: WO2017/045243
PCT Pub. Date: Mar. 23, 2017

(65) Prior Publication Data
US 2017/0192273 A1 Jul. 6, 2017

(30) Foreign Application Priority Data
Sep. 14, 2015 (CN) .......................... 2015 1 0583495

(51) Int. Cl.
G02F 1/1333 (2006.01)
G02F 1/1335 (2006.01)
G06F 3/14 (2006.01)

(52) U.S. Cl.
CPC .... *G02F 1/13336* (2013.01); *G02F 1/133308* (2013.01); *G02F 1/133528* (2013.01);
(Continued)

(58) Field of Classification Search
CPC ................................................... G02F 1/13336
See application file for complete search history.

(56) References Cited

U.S. PATENT DOCUMENTS

2001/0026331 A1* 10/2001 Oota ................. G02F 1/134363
349/43
2006/0007369 A1* 1/2006 Jin ....................... G02F 1/13336
349/58

(Continued)

FOREIGN PATENT DOCUMENTS

CN 101211048 A 7/2008
CN 201107508 Y 8/2008
(Continued)

*Primary Examiner* — Sang V Nguyen
(74) *Attorney, Agent, or Firm* — Andrew C. Cheng

(57) ABSTRACT

A seamless splicing multi-panel display device includes a plurality of first liquid crystal panels being spaced apart, at least one second liquid crystal panel between every two the first liquid crystal panels, and a backlight module opposite to the first liquid crystal panel and the second liquid crystal panel. The first liquid crystal panel includes a first display portion and first non-display portions extending from edges of the first display portion. The second liquid crystal panel includes a second display portion and second non-display portions extending from edges of the second display portion. The second non-display portion is fixed on an area between the first display portion and the first non-display portion. In this way, the multi-panel display device realizes the seamless splicing display so as to enhance the display performance.

9 Claims, 3 Drawing Sheets

(52) U.S. Cl.
CPC .. *G02F 1/133603* (2013.01); *G02F 1/133606* (2013.01); *G06F 3/1423* (2013.01); *G02F 2001/133314* (2013.01); *G02F 2001/133317* (2013.01)

(56) References Cited

U.S. PATENT DOCUMENTS

| | | | | |
|---|---|---|---|---|
| 2007/0001927 | A1* | 1/2007 | Ricks | G09F 9/3026 345/1.1 |
| 2009/0316082 | A1* | 12/2009 | Bae | G02B 6/0038 349/74 |
| 2010/0115807 | A1* | 5/2010 | Shim | G02F 1/133308 40/1 |
| 2011/0019124 | A1* | 1/2011 | Kim | G02F 1/13336 349/58 |
| 2015/0138755 | A1* | 5/2015 | Bastani | G09F 13/04 362/97.1 |

FOREIGN PATENT DOCUMENTS

| | | | |
|---|---|---|---|
| CN | 101424823 A | 5/2009 | |
| CN | 101139905 A | 6/2010 | |
| CN | 104090405 A | 10/2014 | |
| JP | 2006-047845 | * 2/2006 | ........... G02F 1/1333 |
| JP | 2006047845 A | 6/2006 | |
| WO | WO2007005245 A2 | 1/2007 | |

* cited by examiner

SEAMLESS SPLICING MULTI-PANEL DISPLAY DEVICES

BACKGROUND OF THE INVENTION

1. Field of the Invention

The present disclosure relates to panel splicing technology, and more particularly to a seamless splicing multi-panel display device.

2. Discussion of the Related Art

With the development of optoelectronics and semiconductor technology, flat panel display has been greatly developed. With respect to a variety of flat panel display, liquid crystal display (LCD) has been widely adopted in manufacturing or life due to the attributes, such as high space efficiency, low power consumption, no radiation and low electro-magnetic interference.

However, due to the limitation of dimension of the LCD, a plurality of LCDs may have to be spliced together so as to provide a large-scale display, which may be adopted for displaying advertisement on the streets.

Currently, a large-scale LCD may be spliced by arranging and stacking a plurality of LCDs. FIG. 1 is a schematic view of the large-scale LCD spliced by the plurality of LCDs. As shown in FIG. 1, each of the LCDs includes its own border, wherein the width of the border is "B". Thus, a gap exists between two adjacent LCDs during the splicing process, wherein the width of the gap is "A". This may cause display segments in large-scale LCD, wherein within the segment, the images cannot be displayed. The segmented images lead to bad display performance.

SUMMARY

In one aspect, a multi-panel display device for realizing seamless splicing includes: a plurality of first liquid crystal panels being spaced apart, at least one second liquid crystal panel between every two the first liquid crystal panels, and a backlight module opposite to the first liquid crystal panel and the second liquid crystal panel; the first liquid crystal panel includes a first display portion and first non-display portions extending from edges of the first display portion, and the second liquid crystal panel includes a second display portion and second non-display portions extending from edges of the second display portion; and the second non-display portion is fixed on an area between the first display portion and the first non-display portion, and the first non-display portion is fixed below the area between the second display portion and the second non-display portion.

Wherein a line between the second display portion and the respective non-display portion aligns with the line between the non-display portion and the first display portion.

Wherein the second non-display portion is adhered on the area between the first display portion and the first non-display portion, and the first non-display portion is adhered to a down surface of the area between the second display portion and the second non-display portion.

Wherein a down polarizer of the second liquid crystal panel extends until an edge of the first liquid crystal panel below the second liquid crystal panel, and an up polarizer of the first liquid crystal panel extends until the edge of the second liquid crystal panel above the first liquid crystal panel.

Wherein the backlight module includes: a back frame comprising a bottom plate and side plates at two lateral sides of the bottom plate, and the side plate supports the first liquid crystal panel and the second liquid crystal panel; a plurality of light sources facing toward each of the first liquid crystal panels; and a plurality of light sources facing toward each of the second liquid crystal panels.

Wherein the backlight module further includes at least one transparent supporting pillar arranged below an overlapped portion of the first liquid crystal panel and the adjacent second liquid crystal panel, and the transparent supporting pillar supports the first liquid crystal panel and the second liquid crystal panel.

Wherein each of the transparent supporting pillars includes a first sub-transparent supporting pillar and a second sub-transparent supporting pillars, wherein the first sub-transparent supporting pillar is arranged between the corresponding first liquid crystal panel and the bottom plate to support the corresponding first liquid crystal panel, and the second sub-transparent supporting pillar is arranged between the corresponding second liquid crystal panel and the bottom plate to support the corresponding second liquid crystal panel.

Wherein the backlight module further includes a first light beam enhanced component arranged between the first liquid crystal panel, the corresponding side plate, and the first sub-transparent supporting pillar, and a second light beam enhanced component arranged between the second liquid crystal panel, the corresponding second side plate, and the second sub-transparent supporting pillars, wherein the first light beam enhanced component is configured for enhancing quality of light beams radiating the first liquid crystal panel, and the second light beam enhanced component is configured for enhancing quality of light beams radiating the second liquid crystal panel.

Wherein the first light beam enhanced component includes a first diffusion plate and a plurality of optical film above the first diffusion plate, and the first diffusion plate is arranged above the corresponding side plate and the first sub-transparent supporting pillar.

Wherein the second light beam enhanced component includes a second diffusion plate and a plurality of optical film above the second diffusion plate, and the second diffusion plate is arranged above the corresponding side plate and the second sub-transparent supporting pillar, and the second diffusion plate and the optical films above the second diffusion plate extend into the edge of the first liquid crystal panel below the second liquid crystal panel.

In view of the above, the multi-panel display device realizes the seamless splicing, which greatly enhances the display performance.

DETAILED DESCRIPTION OF THE EMBODIMENTS

Figure 1:
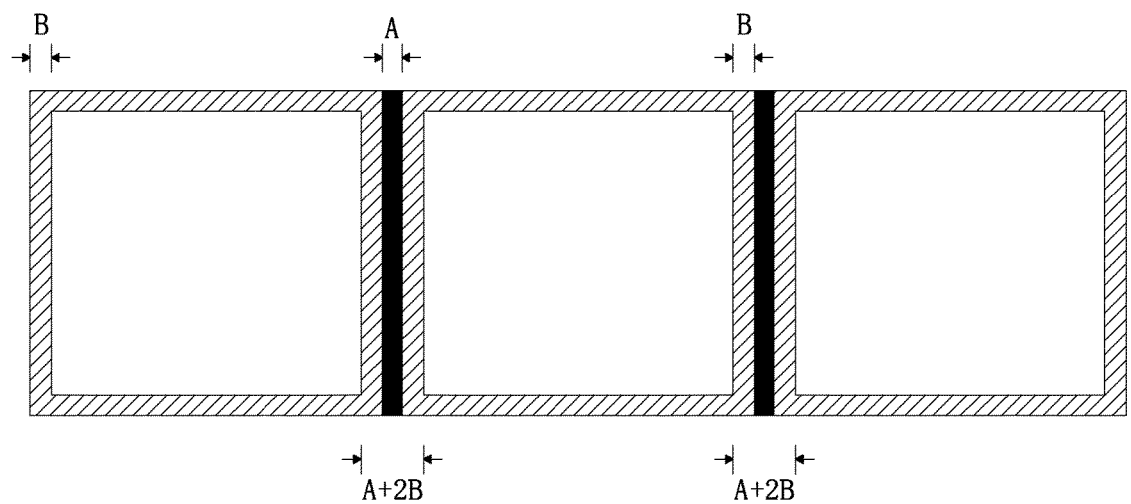
FIG. 1 is a schematic view of the conventional large-scale LCD spliced by the plurality of LCDs.

Various example embodiments will now be described more fully with reference to the accompanying drawings in which some example embodiments are shown. In the drawings, the thicknesses of layers and regions may be exaggerated for clarity. In the following description, in order to avoid the known structure and/or function unnecessary detailed description of the concept of the invention result in confusion, well-known structures may be omitted and/or functions described in unnecessary detail.

It should be noted that the relational terms herein, such as "first" and "second", are used only for differentiating one entity or operation, from another entity or operation, which, however do not necessarily require or imply that there should be any real relationship or sequence.

Figure 2:
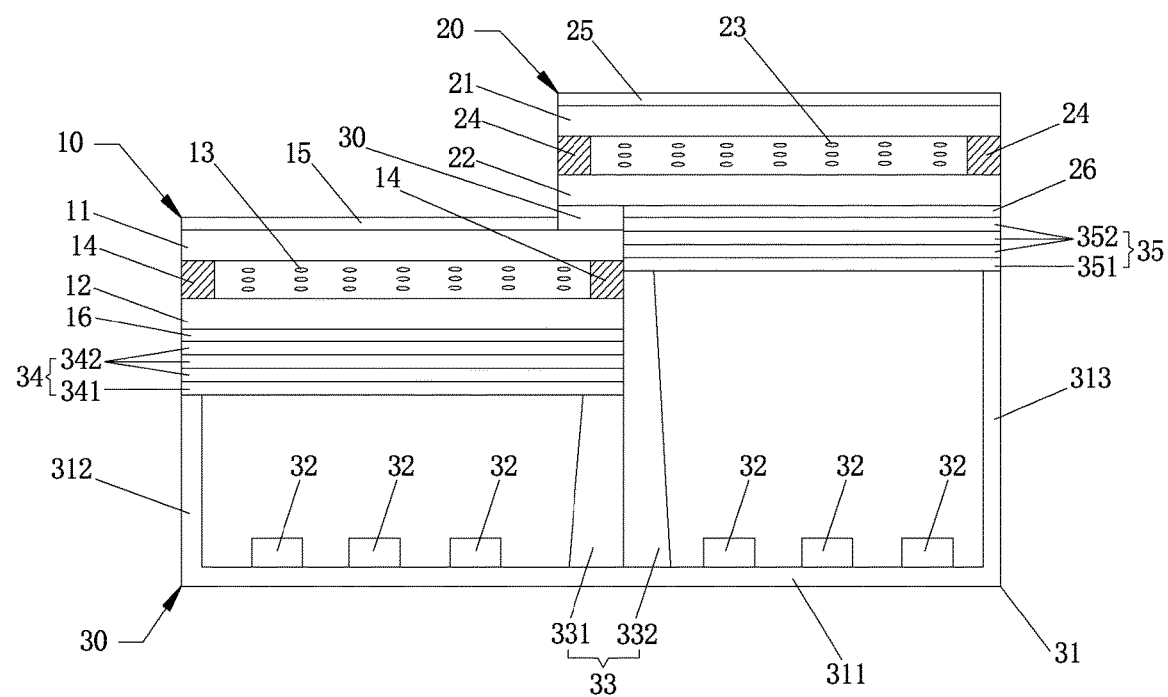
FIG. 2 is a side view of the multi-panel display device for accomplishing the seamless splicing in accordance with one embodiment.

FIG. 2 is a side view of the multi-panel display device for accomplishing the seamless splicing in accordance with one embodiment. The multi-panel display device includes a first liquid crystal panel 10, a second liquid crystal panel 20, and a backlight module 30 arranged opposite to the first liquid crystal panel 10 and the second liquid crystal panel 20.

In a first embodiment, the first liquid crystal panel 10 an up substrate 11 and a down substrate 12 arranged as a cell, liquid crystal molecules 13 between the up substrate 11 and the down substrate 12, liquid crystal encapsulation glue 14 arranged at two ends of the up substrate 11 and the down substrate 12 and the liquid crystal encapsulation glue 14 are between the up substrate 11 and the down substrate 12, an up polarizer 15 adhered to the up substrate 11, and a down polarizer 16 adhered to the down substrate 12. The up substrate 11 is called as the color filter (CF) substrate. The down substrate 12 is called as the array substrate. It is to be noted that the structure of the first liquid crystal panel 10 is not limited to that shown in FIG. 2.

Similarly, in the first embodiment, the second liquid crystal panel 20 includes an up substrate 21 and a down substrate 22 arranged as a cell, liquid crystal molecules 23 between the up substrate 21 and the down substrate 22, transparent liquid crystal encapsulation glue 24 arranged at two ends of the up substrate 21 and the down substrate 22 and the liquid crystal encapsulation glue 24 are between the up substrate 21 and the down substrate 22, an up polarizer 25 adhered to the up substrate 21, and a down polarizer 26 adhered to the down substrate 22. The up substrate 21 is called as the color filter (CF) substrate. The down substrate 22 is called as the array substrate. It is to be noted that the structure of the first liquid crystal panel 20 is not limited to that shown in FIG. 2.

Figure 3:
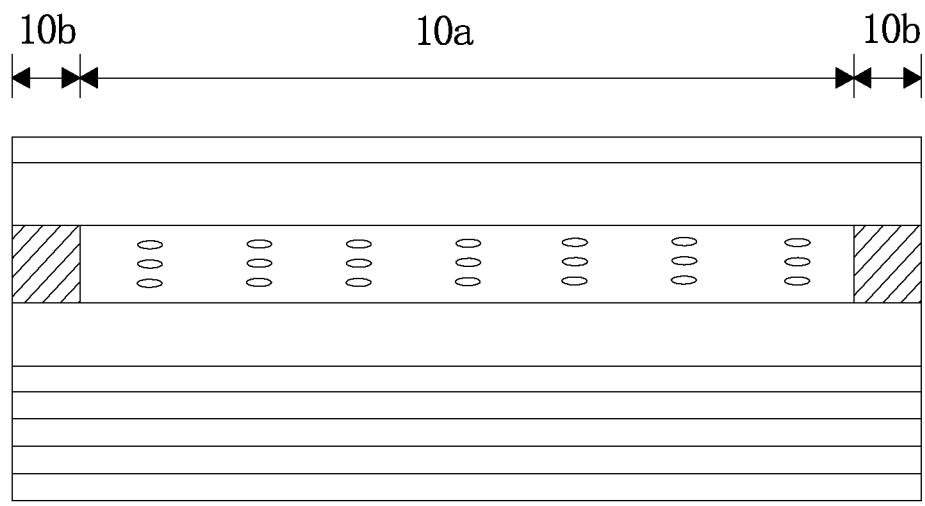
FIG. 3 is a schematic view showing a first display portion and a first non-display portion of the first liquid crystal panel in accordance with one embodiment.

In the embodiment, referring to FIG. 3, a first display portion 10a of the first liquid crystal panel 10 includes the liquid crystal molecules 13 for displaying images. First non-display portions 10b of the first liquid crystal panel 10 include the liquid crystal encapsulation glue 14. That is, in FIG. 3, two ends of the first display portion 10a respectively extend to form the two non-display portion 10b at two lateral sides of the first display portion 10a. FIG. 3 is only a side view of the first liquid crystal panel 10, and thus only two non-display portion 10b at two lateral sides of the first display portion 10a are shown. It is to be noted that, along the direction orthogonal to the paper, two non-display portions 10b are formed at the front and rear sides of the first display portion 10a. In other words, the first display portion 10a extends into four edges of the first display portion 10a to form four non-display portions 10b.

Figure 4:
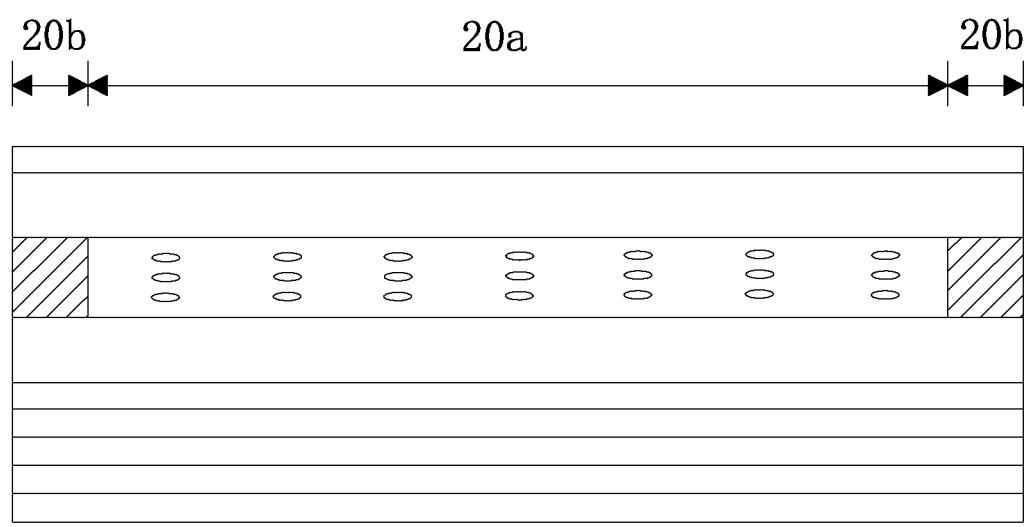
FIG. 4 is a schematic view showing a second display portion and a second non-display portion of the second liquid crystal panel in accordance with one embodiment.

Similarly, in the embodiment, referring to FIG. 4, a first display portion 20a of the first liquid crystal panel 20 includes the liquid crystal molecules 23 for displaying images. First non-display portions 20b of the first liquid crystal panel 20 include the liquid crystal encapsulation glue 24. That is, in FIG. 4, two ends of the first display portion 20a respectively extend to form the two non-display portion 20b at two lateral sides of the first display portion 20a. FIG. 4 is only a side view of the first liquid crystal panel 20, and thus only two non-display portion 10b at two lateral sides of the first display portion 20a are shown. It is to be noted that, along the direction orthogonal to the paper, two non-display portions 20b are formed at the front and rear sides of the first display portion 20a. In other words, the first display portion 20a extends into four edges of the first display portions 20a to form four non-display portions 10b.

Referring to FIGS. 2-4, the second reflective sheets 20b at one side of the second liquid crystal panel 20 is fixed on the first display portion 10a adjacent to the second reflective sheets 20b. The first display portion 10a adjacent to the respective second reflective sheets 20b is fixed below the second display portion 20a adjacent to the non-display portion 20b. As such, a portion of the second liquid crystal panel 20 is arranged above the first liquid crystal panel 10. When the first liquid crystal panel 10 and the second liquid crystal panel 20 display the images, as the transparent liquid crystal encapsulation glue 24 within the non-display portion 20b is transparent, the light beams displayed by the first display portion 10a below the respective non-display portion 20b may pass through the transparent liquid crystal encapsulation glue 24 to display images. In this way, there is no displaying segment between the first liquid crystal panel 10 and the second liquid crystal panel 20 so as to realize seamless slicing display.

In order to obtain great display performance, a line between the second display portion 20a and the respective non-display portion 20b aligns with the line between the non-display portion 10b and the first display portion 10a.

In addition, in the embodiment, the non-display portion 20b of the second liquid crystal panel 20 is adhered to the first display portion 10a by the transparent liquid crystal encapsulation glue 24, and the first display portion 10a is adjacent to the non-display portion 10b. The first display portion 10a, which is adjacent to the non-display portion 20b, is adhered to a down surface of the second display portion 20a, which is adjacent to the non-display portion 20b. As such, a portion of the second liquid crystal panel 20 is fixed on the first liquid crystal panel 10.

In order to increase the bonding power between the second liquid crystal panel 20 and the first liquid crystal panel 10, in the embodiment, the down polarizer 26 of the second liquid crystal panel 20 extends until the edge of the first liquid crystal panel 10 adjacent to the second liquid crystal panel 20. The up polarizer 15 of the first liquid crystal panel 10 extends until the edge of the second liquid crystal panel 20 adjacent to the first liquid crystal panel 10. That is, the down polarizer 26 and the up polarizer 15 have not extend into the overlapped area of the first liquid crystal panel 10 and the second liquid crystal panel 20.

Referring to FIG. 2, the backlight module 30 provides uniform light beams for the first liquid crystal panel 10 and the second liquid crystal panel 20 such that the first liquid crystal panel 10 and the second liquid crystal panel 20 may display images. The backlight module 30 includes a back frame 31 and a light source 32.

The back frame 31 includes a bottom plate 311 and a first side plate 312 and a second side plate 313 at two lateral sides of the bottom plate 311. In the embodiment, the first side plate 312 supports the first liquid crystal panel 10, and the second side plate 313 supports the second liquid crystal panel 20, but not limited to. For instance, the first side plate 312 may support the up substrate 21, and the second side plate 313 may support the first liquid crystal panel 10.

As a distance between the second liquid crystal panel 20 and the bottom plate 311 is larger than the distance between the first liquid crystal panel 10 and the bottom plate 311. Thus, the height of the second side plate 313 is larger than that of the first side plate 312.

A plurality of light sources 32 are arranged on the bottom plate 311, and the light sources 32 face toward the first liquid crystal panel 10. Similarly, a plurality of light sources 32 are arranged on the bottom plate 311, and the light sources 32 face toward the second liquid crystal panel 20. In the embodiment, the light source 32 may be LED and the lens for diffusing the light beams from the LED, but not limited thereto.

In order to increase the support toward the first liquid crystal panel 10 and the second liquid crystal panel 20, the backlight module 30 further includes the transparent supporting pillars 33 below the overlapped portion of the first liquid crystal panel 10 and the second liquid crystal panel 20. Specifically, the supporting pillars 33 include a first sub-transparent supporting pillar 331 and a second sub-transparent supporting pillars 332. The first sub-transparent supporting pillar 331 is below the second liquid crystal panel 20 and is between the first liquid crystal panel 10 and the bottom plate 311 so as to support the first liquid crystal panel 10. The second sub-transparent supporting pillars 332 is arranged between the second liquid crystal panel 20 and the bottom plate 311, and the second sub-transparent supporting pillars 332 adheres to the edge of the first liquid crystal panel 10, which is below the second liquid crystal panel 20, so as to support the second liquid crystal panel 20.

The height of the first sub-transparent supporting pillar 331 is the same with that of the first side plate 312. The height of the second sub-transparent supporting pillars 332 is the same with the height of the second side plate 313. In addition, the first sub-transparent supporting pillar 331 and the second sub-transparent supporting pillars 332 may be integrally formed or may be independent from each other.

In order to enhance the optical quality for the first liquid crystal panel 10 and the second liquid crystal panel 20, the backlight module 30 also include a first light beam enhanced component 34 arranged between the first liquid crystal panel 10, the first side plate 312, and the first sub-transparent supporting pillar 331, and a second light beam enhanced component 35 between the second liquid crystal panel 20, the second side plate 313, and the second sub-transparent supporting pillars 332.

The first light beam enhanced component 34 includes a first diffusion plate 341 and a plurality of optical films 342. The first diffusion plate 341 is arranged above the first side plate 312 and the first sub-transparent supporting pillar 331. The second light beam enhanced component 35 is arranged above a second diffusion plate 351 and a plurality of optical films 352. The second diffusion plate 351 is arranged above the second side plate 313 and the second sub-transparent supporting pillars 332. In addition, the second diffusion plate 351 and the optical films 352 extends into the edge of the first liquid crystal panel 10, and the edge of the first liquid crystal panel 10 is below the second liquid crystal panel 20.

Figure 5:
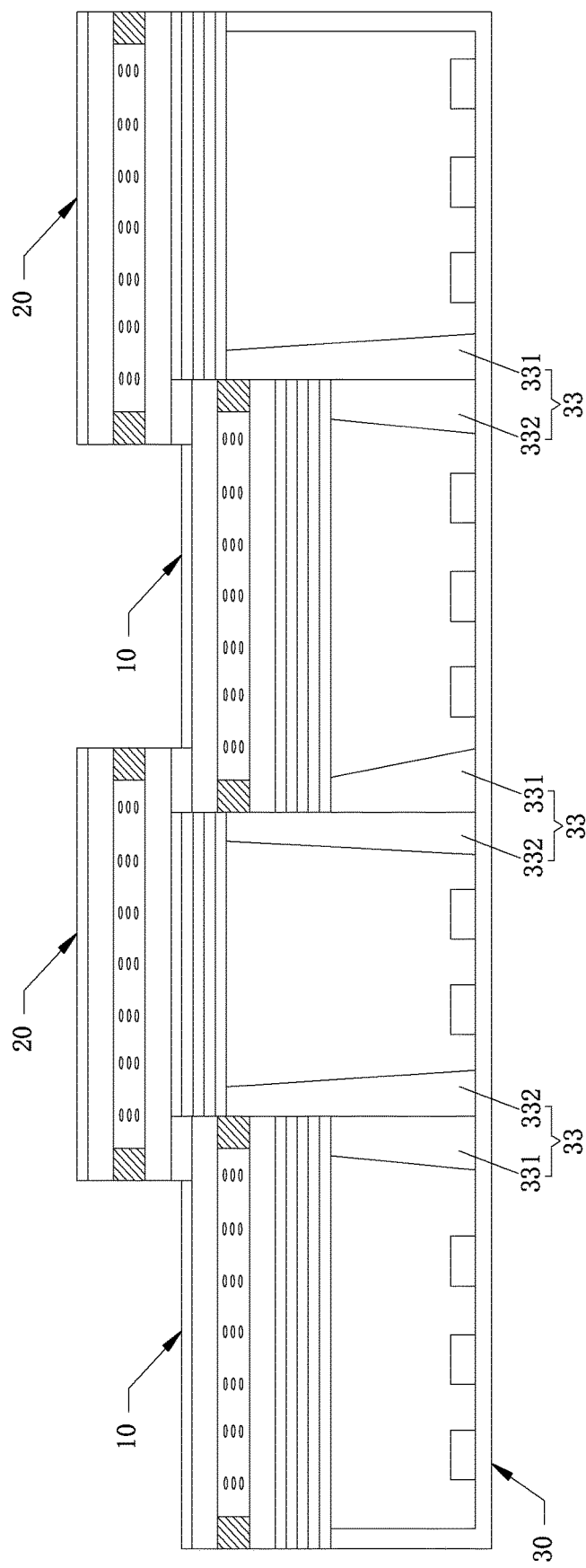
FIG. 5 is a side view of the multi-panel display device spliced by two first liquid crystal panels and two second liquid crystal panels in accordance with one embodiment.

It can be understood that, in FIG. 2, the multi-panel display device includes only two liquid crystal panels, i.e., including the first liquid crystal panel 10 and the second liquid crystal panel 20, is shown, but the present disclosure is not limited thereto. For instance, an arbitrary number of the first liquid crystal panel 10 and the second liquid crystal panel 20 may be configured, along a row direction and/or a column direction, to form the multi-panel display device. FIG. 5 is a side view of the multi-panel display device spliced by two first liquid crystal panels and two second liquid crystal panels in accordance with one embodiment. Referring to FIG. 5, the first liquid crystal panel 10 and the second liquid crystal panel 20 are alternately arranged, and the first liquid crystal panel 10 and the second liquid crystal panel 20 are stacked by adopting the configuration of FIG. 2. In addition, one supporting pillar 33 is configured to be below the overlapped portion of the first liquid crystal panel 10 and the second liquid crystal panel 20 so as to support the first liquid crystal panel 10 and the second liquid crystal panel 20. The configuration of the supporting pillar 33 may be referenced in FIG. 2.

In view of the above, the multi-panel display device realizes the seamless splicing display so as to enhance the display performance.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A multi-panel display device for realizing seamless splicing, comprising:
   a plurality of first liquid crystal panels being spaced apart, at least one second liquid crystal panel for every two adjacent first liquid crystal panels, and a backlight module opposite to the first liquid crystal panel and the second liquid crystal panel;
   the first liquid crystal panel comprising a top substrate, a lower substrate, and a first liquid crystal encapsulation glue arranged at two ends of the top substrate and the lower substrate, the first liquid crystal panel further comprising a first display portion and two first non-display portions defined by the first liquid crystal encapsulation glue, and the second liquid crystal panel comprising a top substrate, a lower substrate, and a second liquid crystal encapsulation glue arranged at two ends of the top substrate and the lower substrate, the second liquid crystal panel further comprising a second display portion and two second non-display portions defined by the second liquid crystal encapsulation glue; and
   wherein a first border line between the second display portion and the second non-display portion aligns with a second border line between the first non-display portion and the first display portion.

2. The multi-panel display device as claimed in claim 1, wherein the second non-display portion is adhered on the area between the first display portion and the first non-display portion, and the first non-display portion is adhered to a down surface of the area between the second display portion and the second non-display portion.

3. The multi-panel display device as claimed in claim 2, wherein a down polarizer of the second liquid crystal panel extends until an edge of the first liquid crystal panel below the second liquid crystal panel, and an up polarizer of the first liquid crystal panel extends until the edge of the second liquid crystal panel above the first liquid crystal panel.

4. The multi-panel display device as claimed in claim 1, wherein the backlight module comprises:
   a back frame comprising a bottom plate and side plates at two lateral sides of the bottom plate,
   and the side plate supports the first liquid crystal panel and the second liquid crystal panel;

a plurality of light sources facing toward each of the first liquid crystal panels; and a plurality of light sources facing toward each of the second liquid crystal panels.

5. The multi-panel display device as claimed in claim 4, wherein the backlight module further comprises at least one transparent supporting pillar arranged below an overlapped portion of the first liquid crystal panel and the adjacent second liquid crystal panel, and the transparent supporting pillar supports the first liquid crystal panel and the second liquid crystal panel.

6. The multi-panel display device as claimed in claim 5, wherein each of the transparent supporting pillars comprises a first sub-transparent supporting pillar and a second sub-transparent supporting pillars, wherein the first sub-transparent supporting pillar is arranged between the corresponding first liquid crystal panel and the bottom plate to support the corresponding first liquid crystal panel, and the second sub-transparent supporting pillar is arranged between the corresponding second liquid crystal panel and the bottom plate to support the corresponding second liquid crystal panel.

7. The multi-panel display device as claimed in claim 6, wherein the backlight module further comprises a first light beam enhanced component arranged between the first liquid crystal panel, the corresponding side plate, and the first sub-transparent supporting pillar, and a second light beam enhanced component arranged between the second liquid crystal panel, the corresponding second side plate, and the second sub-transparent supporting pillars, wherein the first light beam enhanced component is configured for enhancing quality of light beams radiating the first liquid crystal panel, and the second light beam enhanced component is configured for enhancing quality of light beams radiating the second liquid crystal panel.

8. The multi-panel display device as claimed in claim 7, wherein the first light beam enhanced component comprises a first diffusion plate and a plurality of optical film above the first diffusion plate, and the first diffusion plate is arranged above the corresponding side plate and the first sub-transparent supporting pillar.

9. The multi-panel display device as claimed in claim 7, wherein the second light beam enhanced component comprises a second diffusion plate and a plurality of optical film above the second diffusion plate, and the second diffusion plate is arranged above the corresponding side plate and the second sub-transparent supporting pillar, and the second diffusion plate and the optical films above the second diffusion plate extend into the edge of the first liquid crystal panel below the second liquid crystal panel.

* * * * *